(12) United States Patent
Lyu (10) Patent No.: US 9,329,355 B2
(45) Date of Patent: May 3, 2016

(54) LENS MODULE

(71) Applicant: SAMSUNG ELECTRO-MECHANICS CO., LTD., Suwon (KR)

(72) Inventor: Won Ryoul Lyu, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 223 days.

(21) Appl. No.: 13/887,847

(22) Filed: May 6, 2013

(65) Prior Publication Data

US 2014/0254034 A1    Sep. 11, 2014

(30) Foreign Application Priority Data

Mar. 6, 2013   (KR) ..................... 10-2013-0024161

(51) Int. Cl.
G02B 7/02      (2006.01)

(52) U.S. Cl.
CPC ..................................... *G02B 7/021* (2013.01)

(58) Field of Classification Search
CPC ..................................................... G02B 7/021
USPC ......... 359/823–830, 716, 735, 748, 791–792, 359/819, 811
See application file for complete search history.

(56) References Cited

U.S. PATENT DOCUMENTS

| | | | | |
|---|---|---|---|---|
| 3,580,663 A | * | 5/1971 | Hicks ............................ | 359/718 |
| 4,662,717 A | * | 5/1987 | Yamada et al. ................ | 359/362 |
| 7,088,530 B1 | * | 8/2006 | Recco et al. .................. | 359/811 |
| 8,259,402 B2 | | 9/2012 | Lin et al. | |
| 2009/0047011 A1 | * | 2/2009 | Okamoto et al. ............. | 396/529 |
| 2010/0232161 A1 | | 9/2010 | Aschwanden et al. | |
| 2011/0149419 A1 | | 6/2011 | Wu | |

FOREIGN PATENT DOCUMENTS

| | | |
|---|---|---|
| CN | 2665730 Y | 12/2004 |
| CN | 102472878 A | 5/2012 |
| JP | 2002-286987 | 10/2002 |
| JP | 2005-84470 | 3/2005 |
| JP | 2010-224208 | 10/2010 |
| KR | 10-2006-0099712 | 9/2006 |
| TW | 201107811 A1 | 3/2011 |
| TW | 201122599 A1 | 7/2011 |
| TW | 201122601 A1 | 7/2011 |
| TW | 201122609 A1 | 7/2011 |
| TW | 201135302 A1 | 10/2011 |

OTHER PUBLICATIONS

Korean Office Action mailed Feb. 27, 2014 in corresponding Korean Application No. 10-2013-0024161.
Taiwanese Office Action dated Jan. 27, 2015 in corresponding Taiwanese Patent Application No. 102146917.
Chinese Office Action issued on Oct. 26, 2015 in counterpart Chinese Application No. 20131184702.5. (31 pages with English translation).

* cited by examiner

*Primary Examiner* — Thomas K Pham
*Assistant Examiner* — Vipin Patel
(74) *Attorney, Agent, or Firm* — NSIP Law (57) ABSTRACT

There is provided a lens module, including: a first lens having an extended portion, a second lens in contact with the extended portion to be aligned with the first lens, and a third lens in contact with the extended portion to be aligned with the second lens. In the lens module, the plurality of lenses are easily alignable in terms of optical axes thereof.

20 Claims, 7 Drawing Sheets

LENS MODULE

CROSS-REFERENCE TO RELATED APPLICATIONS

This application claims the priority of Korean Patent Application No. 10-2013-0024161 filed on Mar. 6, 2013, in the Korean Intellectual Property Office, the disclosure of which is incorporated herein by reference.

BACKGROUND OF THE INVENTION

1. Field of the Invention

The present invention relates to a lens module including a plurality of lenses, and more particularly, to a lens module in which a plurality of lenses are easily alignable in terms of optical axes thereof.

2. Description of the Related Art

As portable devices such as mobile phones have advanced technologically, there is an increasing demand for higher resolutions in small cameras which such portable devices are commonly equipped with. Accordingly, small cameras have been developed to have lens modules including ever larger amounts of lenses.

A lens module including a plurality of lenses may include a lens barrel accommodating the lenses. Such a lens module is commonly configured such that individual lenses are inserted into a lens barrel sequentially so as to be aligned with the optical axes of the lenses.

In this manner, however, in order to align the optical axes of the lenses with the lens barrel, the lenses to be inserted into the lens barrel need to be manufactured to have the same size and the same degree of processing errors, which may be difficult to undertake.

Accordingly, an optical axis alignment structure suitable for a high resolution lens module including a plurality of lenses is required in a manufacturing process.

In this regard, as the related art, there is provided Patent Document 1. Patent Document 1 discloses the technical concept of aligning a plurality of lenses using a conical sectional surface. With this configuration, however, respective lenses have respective reference surfaces for aligning the optical axes thereof, and, therefore, as greater amounts of lenses are stacked, the probability that optical axes of the lenses will be misaligned increases.

RELATED ART DOCUMENT (Patent Document 1) Japanese Patent Laid-Open Publication No. 2002-286987 A

SUMMARY OF THE INVENTION

An aspect of the present invention provides a lens module having a lens coupling structure in which a plurality of lenses are easily alignable in terms of optical axes thereof.

According to an aspect of the present invention, there is provided a lens module, including: a first lens having an extended portion, a second lens in contact with the extended portion to be aligned with the first lens, and a third lens in contact with the extended portion to be aligned with the second lens.

An inner circumferential surface of the extended portion may be defined as a conical sectional surface of a theoretical cone inclinedly angled with respect to an optical axis.

Each of the second lens and the third lens may have an inclined surface in contact with the conical sectional surface.

The second lens and the third lens may have different radii.

The extended portion may have at least one groove formed therein, the groove extending in a longitudinal direction of the extended portion.

Each of the second lens and the third lens may have at least one protrusion to be inserted into the at least one groove.

The extended portion may have a first groove and a second groove formed therein, the first groove and the second groove extending in a longitudinal direction of the extended portion and having different widths.

The second lens may include a first protrusion to be inserted into the first groove, and the third lens may include a second protrusion to be inserted into the second groove.

The extended portion may have a fixation groove formed therein, the fixation groove extending in a longitudinal direction of the extended portion and then extending in a circumferential direction of the extended portion.

The third lens may include a protrusion protruded to be guided by the fixation groove.

The lens module may further include a fourth lens group in contact with the extended portion to be aligned with the third lens.

The fourth lens group may include a plurality of lenses.

According to another aspect of the present invention, there is provided a lens module, including: a first lens; a second lens coupled to the first lens and having an extended portion; a third lens in contact with the extended portion to be aligned with the second lens; and a fourth lens in contact with the extended portion to be aligned with the third lens.

An circumferential surface of the extended portion may be defined as a conical sectional surface of a theoretical cone inclinedly angled with respect to an optical axis.

Each of the third lens and the fourth lens may have an inclined surface in contact with the conical sectional surface.

The third lens and the fourth lens may have different radii.

The extended portion may have at least one groove formed therein, the groove extending in a longitudinal direction of the extended portion.

Each of the third lens and the fourth lens may have at least one protrusion to be inserted into the at least one groove.

The extended portion may have a first groove and a second groove formed therein, the first groove and the second groove extending in a longitudinal direction of the extended portion and having different widths.

The third lens may include a first protrusion to be inserted into the first groove, and the fourth lens may include a second protrusion to be inserted into the second groove.

The extended portion may have a fixation groove formed therein, the fixation groove extending in a longitudinal direction of the extended portion and then extending in a circumferential direction of the extended portion.

The fourth lens may include a protrusion protruded to be guided by the fixation groove.

The lens module may further include a fifth lens group in contact with the extended portion to be aligned with the fourth lens.

The fifth lens group may include a plurality of lenses.

According to another aspect of the present invention, there is provided a lens module, including: a first lens having a first extended portion; a second lens in contact with the first extended portion to be aligned with the first lens; a third lens in contact with the first extended portion to be aligned with the second lens, and having a second extended portion; and a fourth lens in contact with the second extended portion to be aligned with the third lens.

An inner circumferential surface of the first extended portion may be defined as a first conical sectional surface of a theoretical cone inclinedly angled at a first angle with respect to an optical axis; and an inner circumferential surface of the second extended portion may be defined as a second conical sectional surface of the theoretical cone inclinedly angled at a second angle with respect to the optical axis.

Each of the second lens and the third lens may have an inclined surface in contact with the first conical sectional surface, and the fourth lens may have an inclined surface in contact with the second conical sectional surface.

The second lens, the third lens and the fourth lens may have different radii.

The lens module may further include a fifth lens group in contact with the second extended portion to be aligned with the fourth lens.

The fifth lens group may include a plurality of lenses.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Embodiments of the present application will now be described in detail with reference to the accompanying drawings.

The inventive concept of the application may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art.

In the drawings, the shapes and dimensions of elements may be exaggerated for clarity, and the same reference numerals will be used throughout to designate the same or like elements.

Figure 1:
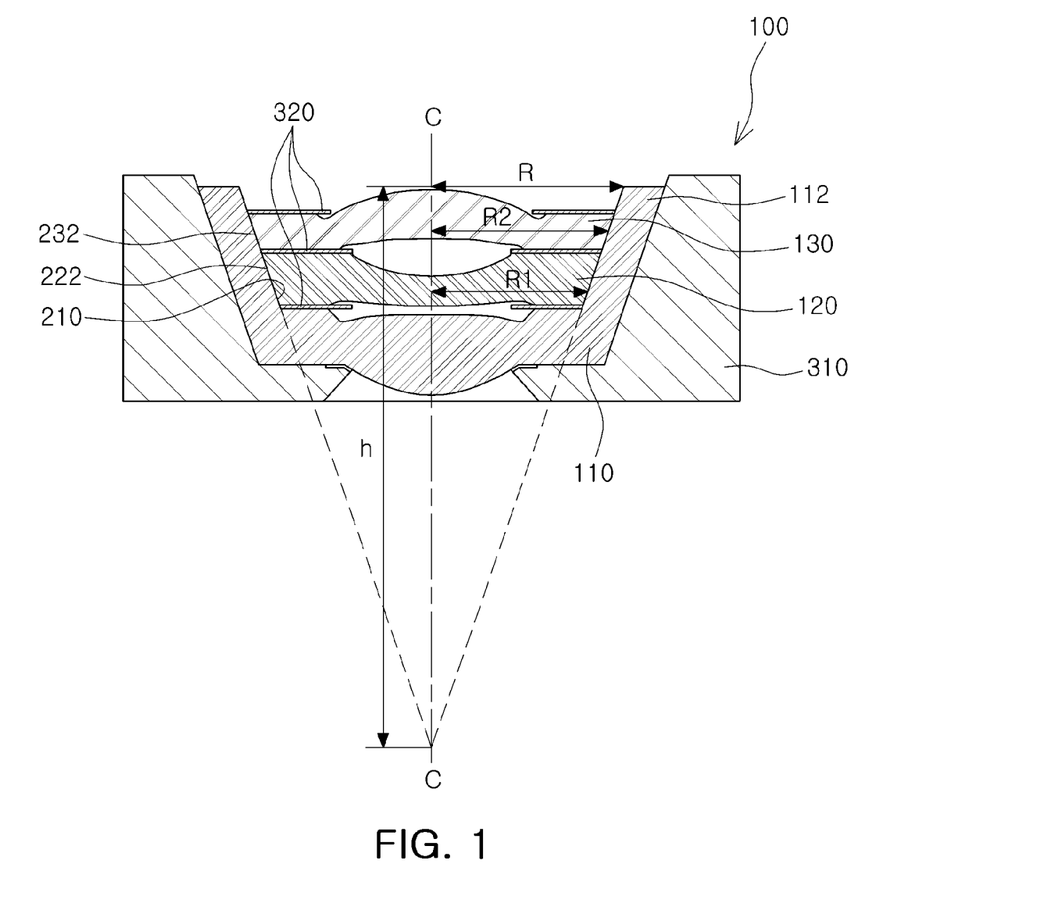
FIG. 1 is a cross-sectional view of a lens module according to an embodiment of the present invention.
Figure 2:
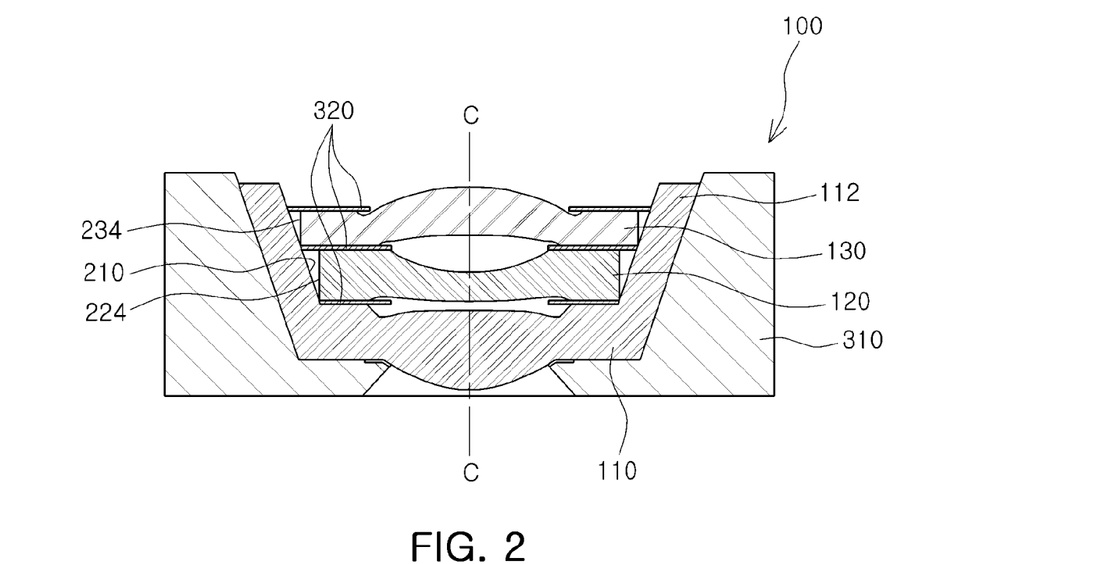
FIGS. 2 and 3 are cross-sectional views showing other forms of the lens module according to the embodiment of the present invention.
Figure 3:
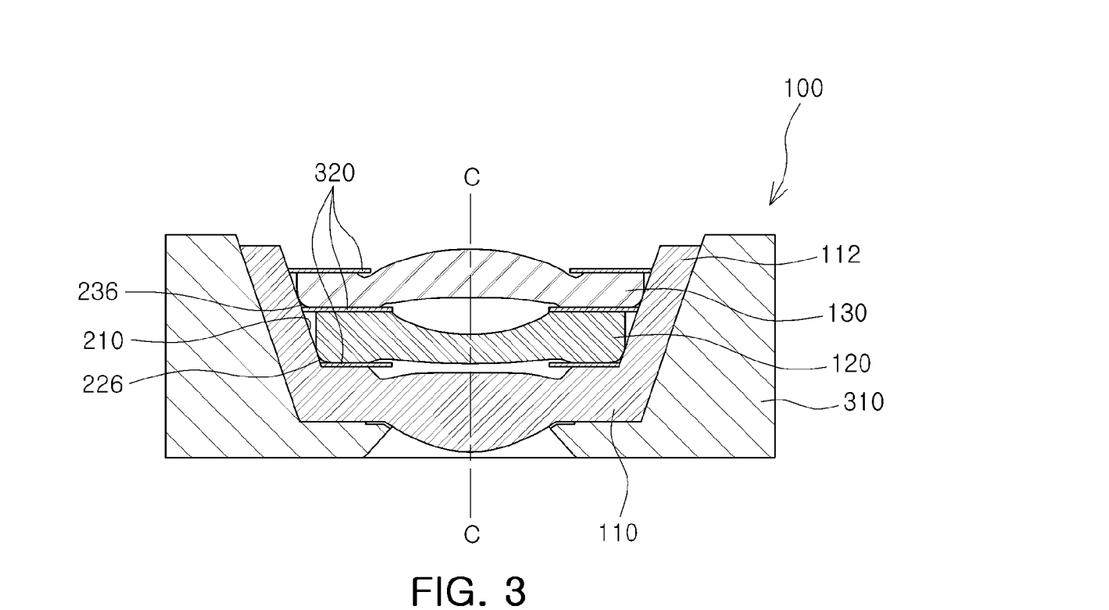
Figure 4:
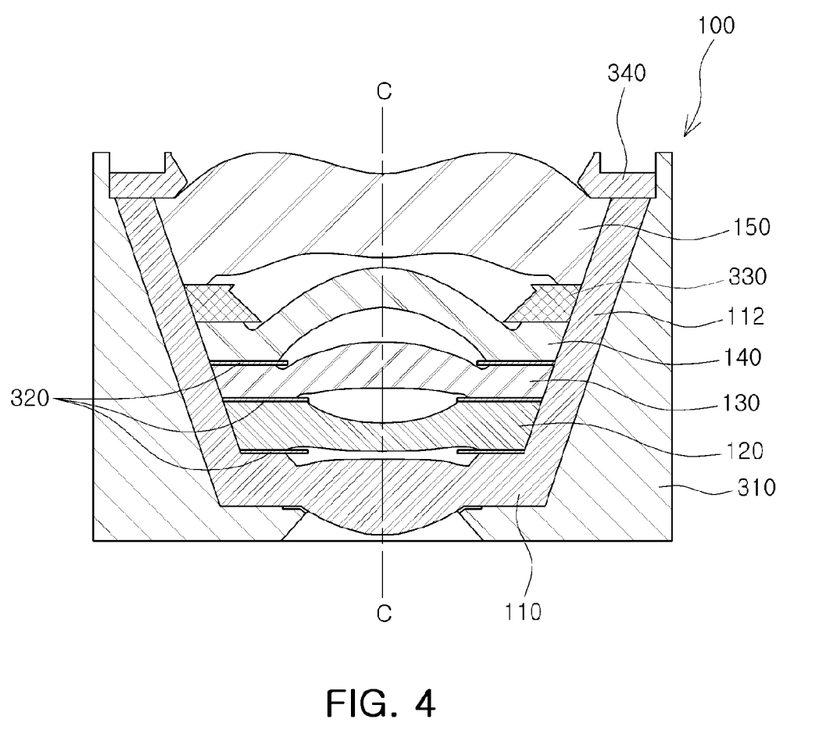
FIG. 4 is a cross-sectional view showing another form of the lens module according to the embodiment of the present invention.
Figure 5:
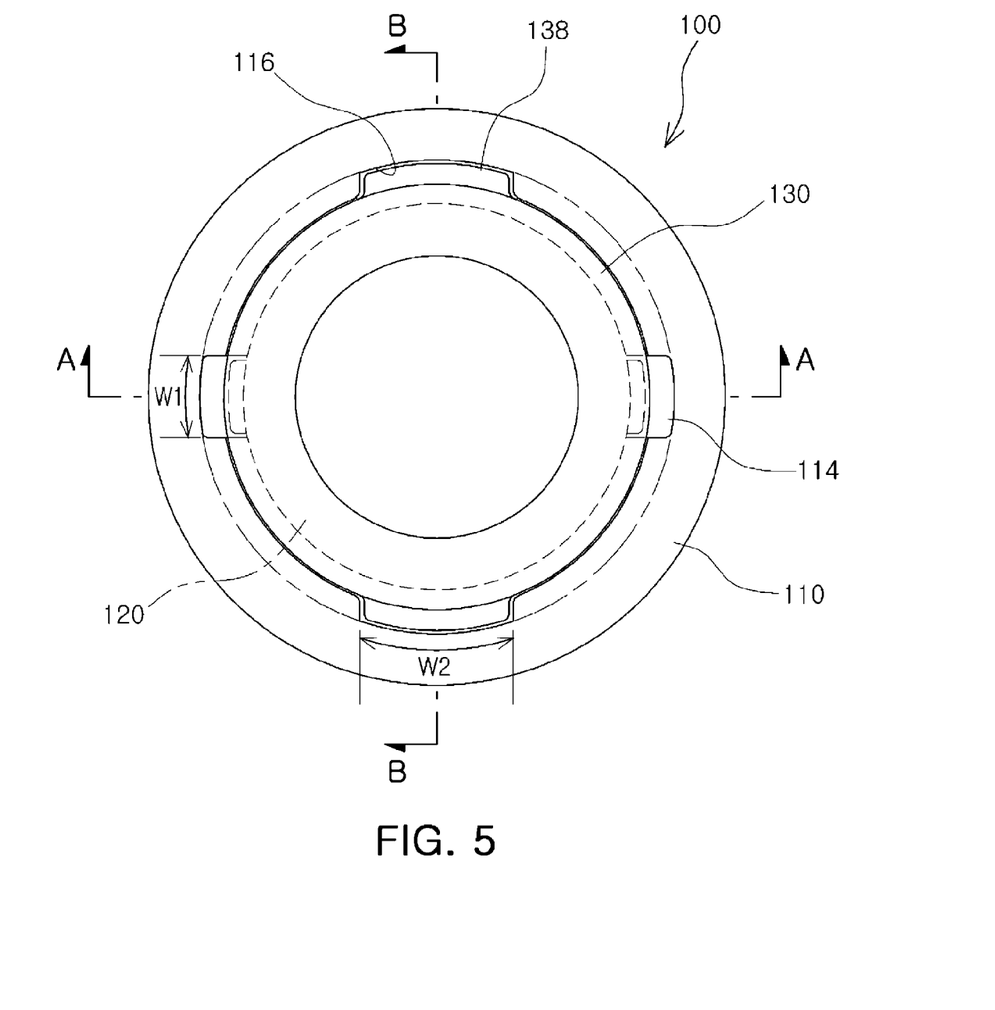
FIG. 5 is a plan view of a lens module according to another embodiment of the present invention.
Figure 6:
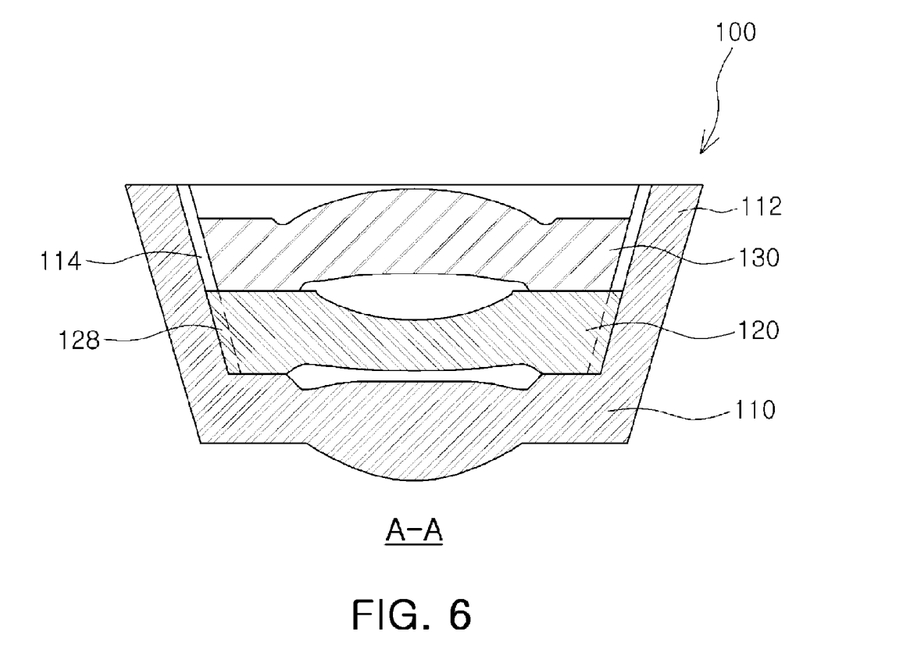
FIG. 6 is a cross-sectional view taken along line A-A of the lens module shown in FIG. 5.
Figure 7:
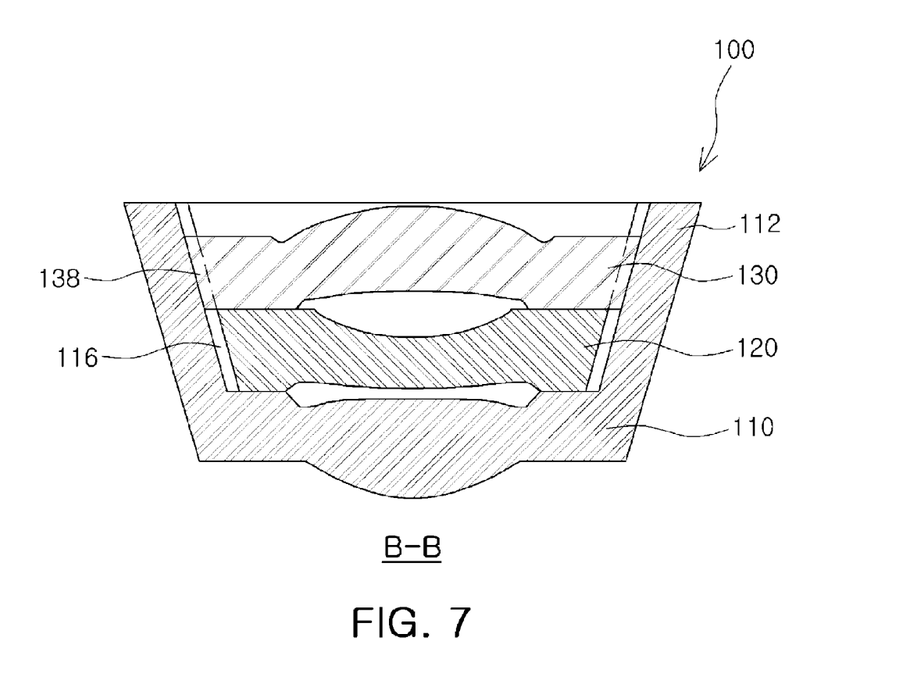
FIG. 7 is a cross-sectional view taken along line B-B of the lens module shown in FIG. 5.
Figure 8:
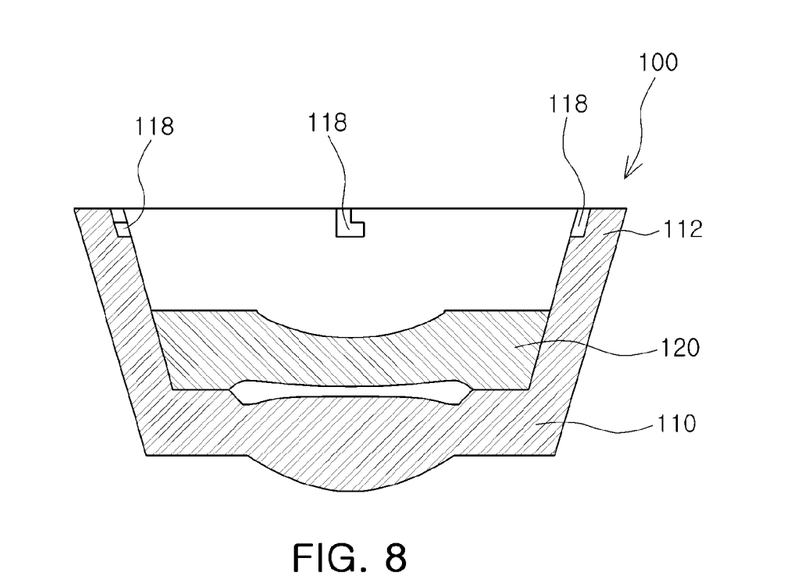
FIG. 8 is a cross-sectional view of a lens module according to another embodiment of the present invention.
Figure 9:
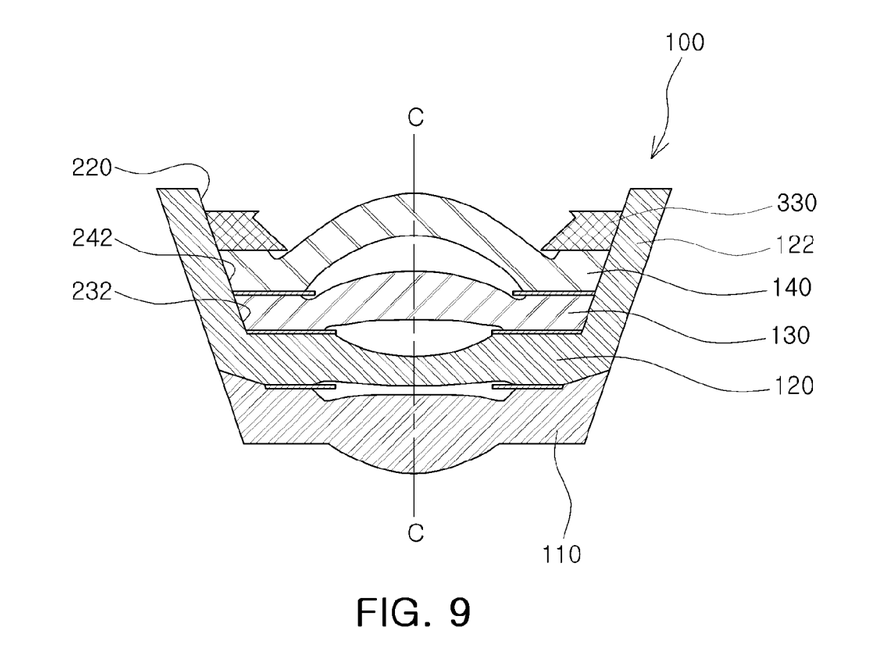
FIG. 9 is a cross-sectional view of a lens module according to another embodiment of the present invention.
Figure 10:
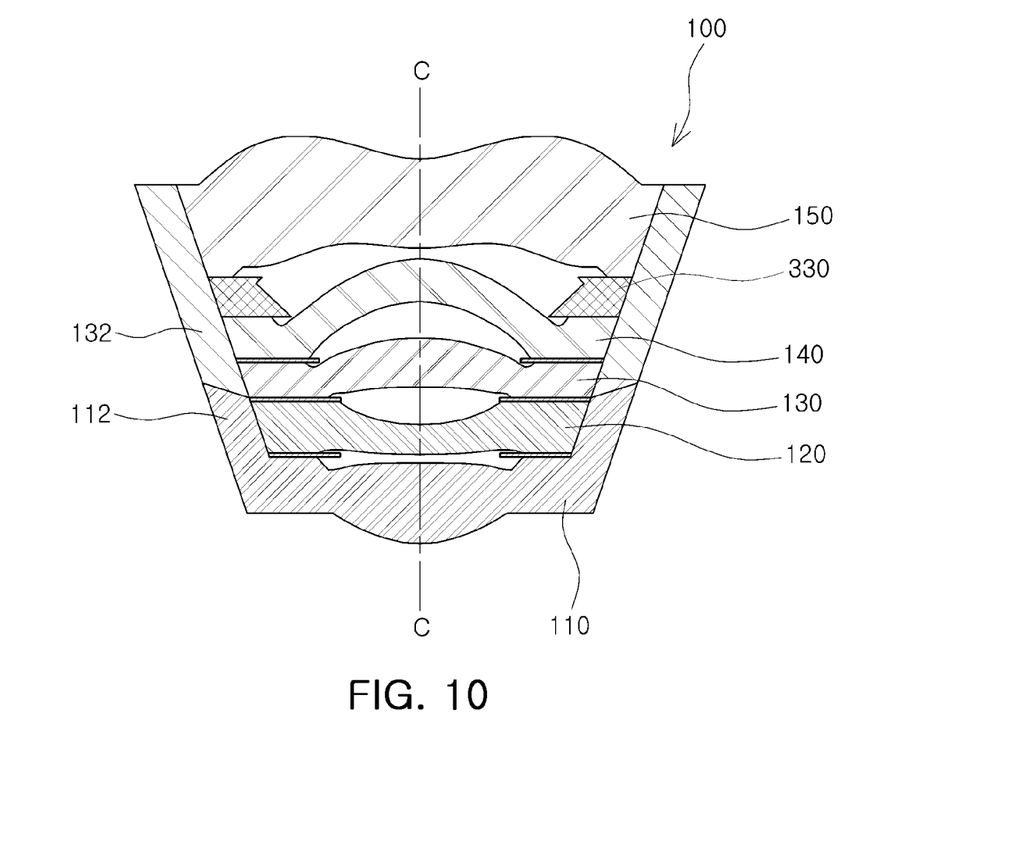
FIG. 10 is a cross-sectional view of a lens module according to another embodiment of the present invention.

FIG. 1 is a cross-sectional view of a lens module according to an embodiment of the present invention; FIGS. 2 and 3 are cross-sectional views showing other forms of the lens module according to the embodiment of the present invention; FIG. 4 is a cross-sectional view showing another form of the lens module according to the embodiment of the present invention; FIG. 5 is a plan view of a lens module according to another embodiment of the present invention; FIG. 6 is a cross-sectional view taken along line A-A of the lens module shown in FIG. 5; FIG. 7 is a cross-sectional view taken along line B-B of the lens module shown in FIG. 5; FIG. 8 is a cross-sectional view of a lens module according to another embodiment of the present invention; FIG. 9 is across-sectional view of a lens module according to another embodiment of the present invention; and FIG. 10 is a cross-sectional view of a lens according to another embodiment of the present invention.

A lens module according to an embodiment of the present invention will be described with reference to FIGS. 1 to 4.

A lens module 100 according to the embodiment of the invention may include a first lens 110, a second lens 120, and a third lens 130. Optionally, the lens module 100 may further include a lens barrel 310 and a light blocking member 320. Further, the lens module 100 may include more lenses depending on the degree of resolution desired to be implemented in the lens module 100.

The first lens 110 may be formed of glass, glass molding, thermosetting resin, thermoplastic resin, or plastic. The first lens 110 may generally have positive or negative refractive power. The first lens 110 may be positioned closer to an imaging object than the second lens 120 in the lens module 100.

The first lens 110 may include a lens part and a flange part. The lens part may refract incident light reflected from an imaging object. To this end, the lens part may have a convex, a concave or a meniscus shape. The flange part may form an edge of the lens part. The flange part may make contact with another lens (i.e., the second lens 120). Optionally, a light blocking material may be coated on the flange part or a light blocking film may be applied thereto. With the light blocking material or film, undesired light may be prevented from propagating into the second lens 120 through the flange part.

Additionally, an extended portion 112 may be extended from the flange part of the first lens 110. The extended portion 112 may be inclinedly angled with respect to the optical axis C-C. More specifically, an inner circumferential surface 210 of the extended portion 112 may correspond to a surface inclinedly angled with respect to the optical axis C-C. That is, the inner circumferential surface 210 may form a theoretical cone centered on the optical axis C-C. Further, the extended portion 112 may be sized such that it is able to accommodate two or more lenses. Specifically, the extended portion 112 may accommodate both the second lens 120 and the third lens 130.

The second lens 120 may be formed of glass, glass molding, thermosetting resin, thermoplastic resin, or plastic. The second lens 120 may generally have positive or negative refractive power. The second lens 120 may be positioned closer to an image sensor than the first lens 110 in the lens module 100.

The second lens 120 may also include a lens part and a flange part. Here, the lens part of the second lens 120 may aligned on the same optical axis as the lens part of the first lens 110. Further, the flange part of the second lens 120 may contact the flange part of the first lens 110.

The second lens 120 may be moved in the optical axis direction relative to the extended portion 112. Specifically, the second lens 120 may have an inclined surface 222 in contact with the inner circumferential surface of the extended portion 112. Here, the inclined surface 222 may form an edge of the second lens 120, and may be inclinedly angled to correspond to the inner circumferential surface 210 of the extended portion 112. In other words, the second lens 120 may have a conical sectional surface corresponding to the inner circumferential surface 210.

The second lens 120 thus shaped may be moved relative to the extended portion 112 and contact the first lens 110. In addition, the definitive location of the second lens 120 may be determined by a radius R1 of the second lens 120. Specifically, the second lens 120 may be moved downwardly (with respect to FIG. 1) on the optical axis C-C and contact the extended portion 112 at a location on the inner circumferential surface 210, the radius of which is identical to the radius R1 of the second lens 120. Here, in the location detailed above, the flange part of the second lens 120 and the flange part of the first lens 110 may contact each other. Accordingly, provided that specific dimensions (a radius R of a bottom surface and height h) of the theoretical cone formed by the inner circumferential surface 210 are known, the location of the second lens 120, relative to the first lens 110 may be predicted and calculated. Further, the size of the second lens 120 (i.e., the radius R1 thereof) may be adjusted so that the location of the second lens 120 relative to the first lens 110 may be designed as desired.

The third lens 130 may be formed of glass, glass molding, thermosetting resin, thermoplastic resin, or plastic. The third lens 130 may generally have positive or negative refractive power. The third lens 130 may be positioned closest to the image sensor in the lens module 100.

The third lens 130, like the other lenses 110 and 120, may also include a lens part and a flange part. Here, the lens part of the third lens 130 may aligned on the same optical axis as the lens part of the second lens 120. Further, the flange part of the third lens 130 may contact the extended portion 112 of the first lens 110 or the flange part of the second lens 120.

The third lens 130 may be moved in the optical axis direction relative to the extended portion 112. Specifically, the third lens 130 may have an inclined surface 232 in contact with the inner circumferential surface of the extended portion 112. Here, the inclined surface 232 may form an edge of the third lens 130, and may be inclinedly angled to correspond to the inner circumferential surface 210 of the extended portion 112. In other words, the third lens 130 may have the conical sectional surface corresponding to the inner circumferential surface 210.

The third lens 130 thus shaped may be moved relative to the extended portion 112 and contact the second lens 120. In addition, the definitive location of the third lens 130 may be determined by a radius R2 of the third lens 130. Specifically, the third lens 130 may be moved downwardly (with respect to FIG. 1) on the optical axis C-C and contact the extended portion 112 at a location on the inner circumferential surface 210, the radius of which is identical to the radius R2 of the third lens 130. Here, in the location above, the flange part of the third lens 130 and the flange part of the second lens 120 may contact each other. Accordingly, provided that specific dimensions (the radius R of the bottom surface and height h) of the theoretical cone formed by the inner circumferential surface 210 are known, the location of the third lens 130 relative to the first lens 110 may be specifically predicted and calculated. Further, the size of the third lens 130 (i.e., the radius R2 thereof) may be adjusted so that the location of the third lens 130 relative to the first lens 110 may be designed as desired.

The light blocking member 320 may be disposed between the first lens 114 and the second lens 120. The light blocking member 320 may adjust the amount of light incident from the first lens 110 to the second lens 120. For instance, undesired light incident from the first lens 110 is blocked so that it is not incident on the second lens 120. Here, the light blocking member 320 may have a ring shape in which a portion corresponding to the optical axis C-C portion is open.

The light blocking member 320 may be formed of a non-ferrous metal material. For example, the light blocking member 320 may be formed of copper or aluminum. In this configuration, it is advantageous that the light blocking member 320 may be easily molded and the light blocking member 320 is produced in a less costly manner.

The lens module 100 may further include the lens barrel 310. The lens barrel 310 may have a cylindrical shape, and may accommodate the first to third lenses 110 to 130 therein. Specifically, the lens barrel 310 may accommodate the first lens 110 integrated with the second and third lenses 120 and 130 therein. Here, a contact surface between an inner surface of the lens barrel 310 and the first lens 110 may have a conical sectional shape.

The lens barrel 310 may be formed of materials having the same linear expansion coefficient as the lenses 110, 120 and 130. For example, the lens barrel 310 may be formed of polyarylate (PAR). Here, the polyarylate material generally has the same linear expansion coefficient as the lenses 110, 120 and 130 formed of a plastic material, such that the expansion or contraction of the lenses caused by changes in the temperature of the surrounding environment is effectively mitigated.

In the lens module 100 thus configured, the locations of the second and third lenses 120 and 130 may be determined with reference to the first lens 110, thereby improving the design accuracy of the optical system. Moreover, in the lens module 100, the optical axes of the second and third lenses 120 and 130 are determined by the extended portion 112 of the first lens 110, such that the optical axes of the lenses 110, 120 and 130 may be quickly and easily aligned. Further, the optical reliability of the optical system including the lenses 110, 120 and 130 may be improved.

Although edges of the second and third lenses 120 and 130 have the same inclined shape as the inner circumferential surface 210 in FIG. 1, the edges thereof may have vertical surfaces 224 and 234 or curved surfaces 226 and 236, as shown in FIGS. 2 and 3, as needed.

In addition, although the lens modules 100 shown in FIGS. 1 to 3 consist of three lenses, the lens modules may consist of five lenses including a fourth lens 140 and a fifth lens 150 as shown in FIG. 4. Further, a spacer member 330 may be additionally disposed between the lenses in order to keep effective focal distances. In this regard, the element referred to by reference numeral 340 may be a clamp ring to fix the lenses 110, 120, 130, 140 and 150 to the lens barrel 310.

Hereinafter, a lens module according to another embodiment of the present invention will be described. In the description of the following embodiments, the same reference numerals will be used to denote elements the same as those of the above-described embodiment, detailed descriptions of which will be omitted.

A lens module according to another embodiment of the present invention will be described with reference to FIGS. 5 to 7.

The lens module 100 according to this embodiment of the invention is different from the lens module 100 according to the above-described embodiment of the invention, in that a plurality of grooves 114 and 116 are formed in a first lens 110. In addition, the lens module 100 according to the present embodiment of the invention is different from the lens module 100 according to the above-described embodiment of the invention in terms of the shape of the lenses 120 and 130.

Specifically, each of the second lens 120 and the third lens 130 may include protrusions 128 and 138 to be inserted into the grooves 114 and 116.

The first lens 110 may include the extended portion 112 extending in an optical direction. Here, the inner circumferential surface 210 of the extended portion 112 may correspond to a surface inclinedly angled with respect to the optical axis. That is, the inner circumferential surface 210 may form a theoretical cone.

The plurality of grooves 114 and 116 may be formed in the inner circumferential surface 210. Specifically, the first groove 114 and the second groove 116 may be formed in the inner circumferential surface 210 in an amount corresponding to that of the lenses accommodated in the inner circumferential surface 210. However, the amount of the first groove 114 and the second groove 116 formed in the inner circumferential surface 210 is not limited to the amount of the lenses accommodated in the inner circumferential surface 210, but may be provided in an amount greater than that of the lenses.

The plurality of grooves 114 and 116 may be extended in the inner circumferential surface 210. Further, the plurality of grooves 114 and 116 may be used as guide members for guiding the position of different lenses 120 and 130. For example, the first groove 114 may be used as a guide member for guiding the position of the second lens 120 only, and the second groove 116 may be used as a guide member for guiding the position of the third lens 130 only. To this end, the first groove 114 and the second groove 116 may have different widths. Specifically, a width W1 of the first groove 114 may be smaller than a width W2 of the second groove 116 (see FIG. 5). Further, the first groove 114 and the second groove 116 may have different depths.

The second lens 120 may include one or more protrusions 128. Specifically, the second lens 120 may have one or more protrusions 128 having a cross-sectional shape corresponding to that of the first groove 114. Accordingly, the second lens 120 may be coupled to the extended portion 112 of the first lens 110 by the engagement of the first groove 114 and the protrusion 128 (see FIG. 6).

The third lens 130 may include one or more protrusions 138. Specifically, the third lens 130 may have one or more protrusions 138 having a cross-sectional shape corresponding to that of the second groove 116. Accordingly, the third lens 130 may be coupled to the extended portion 112 of the first lens 110 by the engagement of the second groove 116 and the protrusion 138 (see FIG. 7).

In the lens module 100 thus configured, the second lens 120 and the third lens 130 may be easily distinguished from one another, such that the second lens 120 and the third lens 130 may be easily stacked on one another sequentially. Further, the first lens 110, the second lens 120 and the third lens 130 are coupled by means of the grooves 114 and 116 and the protrusions 128 and 138, whereby coupling strength between the lenses 110, 120 and 130 may be increased.

Next, a lens module according to another embodiment of the present invention will be described with reference to FIG. 8.

The lens module 100 according to this embodiment of the invention is different from the lens module 100 according to the above-described embodiments of the invention in that a fixation groove 118 is formed in the first lens 110. Specifically, the fixation groove 118 is extended in a longitudinal direction of the extended portion 112 and extended in a circumferential direction of the extended portion at a certain location. Further, although not shown in the drawings, the third lens 130 may include a protrusion to be inserted into the fixation groove 118.

The lens module 100 thus configured may prevent the third lens 130 from separating from the extended portion 112 of the first lens 110 by the protrusion inserted into the fixation groove 118. Further, the separation of the second lens 120 is prevented by the third lens 130. Accordingly, this embodiment may be advantageous for increasing coupling strength between the lenses.

Next, a lens module according to another embodiment of the present invention will be described with reference to FIG. 9.

The lens module 110 according to this embodiment is different from the lens modules according to the above-mentioned embodiments in terms of the formation location of the extended portion of the lens module 100. Specifically, in this embodiment, an extended portion 122 may be formed from the second lens 120 as shown in FIG. 9. Hereinafter, the shape of the second lens 120 will be specifically described.

The second lens 120 may have the extended portion 122. Specifically, the extended portion 122 may be extended from the flange part of the second lens 120. The extended portion 122 may be inclinedly angled with respect to the optical axis C-C. In addition, an inner circumferential surface 220 of the extended portion 122 may be a surface inclinedly angled with respect to the optical axis C-C. That is, the inner circumferential surface 220 may form a theoretical cone centered on the optical axis C-C. Further, the extended portion 122 may be sized such that it is able to accommodate two or more lenses. Specifically, the extended portion 122 may accommodate both the third lens 130 and the fourth lens 140. Here, edges of the third lens 130 and the fourth lens 140 may be inclinedly angled surfaces corresponding to the inner circumferential surface 220.

Further, the first lens 110 and the second lens 120 may by coupled by bonding the inclined surfaces thereof or by engaging protrusions and grooves.

The lens module 100 thus configured may be advantageous when one lens is not able to accommodate all of the plurality of lenses. Alternatively, the lens module 100 thus configured may be advantageous in a situation in which it is difficult to form the extended portion 112 from the first lens 110.

Next, a lens module according to another embodiment of the present invention will be described with reference to FIG. 10.

The lens module 100 according to this embodiment is different from the lens modules according to the above-mentioned embodiments in that extended portions are formed from a plurality of lenses.

In this embodiment, extended portions 112 and 132 may be formed from the first lens 110 and the third lens 130, respectively. Here, the extended portion 112 of the first lens 110 and the extended portion 132 of the third lens 130 may contact one another and may have the same angle of inclination, as shown in FIG. 10.

The extended portion 112 of the first lens 110 may accommodate the second lens 120. Specifically, the second lens 120 may be completely inserted into the extended portion 112. Although the extended portion 112 of the first lens 110 according to this embodiment is described and depicted as accommodating the second lens 120 only, it may further accommodate a spacer member and the third lens 130, as necessary. For example, the extended portion 112 of the first lens 110 may partly accommodate one surface of the third lens 130.

The extended portion 132 of the third lens 130 may accommodate the fourth lens 140 and the fifth lens 150. Here, the coupling structure of the extended portion 132 of the third lens 130 and the fourth and fifth lenses 140 and 150 may be the same as the coupling structure of the first, second and third lenses 110, 120 and 130 described with respect to the first embodiment.

In the lens module 100 thus configured, a plurality of lenses are separately accommodated by the first lens 110 and the third lens 130, such that partial replacement of lenses due to molding deviations may be easily undertaken. For example, in the lens module 100 according to this embodiment, a partial replacement of the first lens 110 and the second lens 120 and a partial replacement of the third to fifth lenses 130, 140 and 150 may be easily undertaken, such that the production yield of the lens module 100 can be improved.

As set forth above, in a lens module according to embodiments of the present invention, a plurality of lenses can be easily aligned with an optical axis.

Further, according to the embodiments of the invention, one lens contributes to alignment of other lenses with an optical axis, such that deviation from the optical axis of the lenses due to processing errors can be minimized.

Accordingly, the optical quality of the lens module including the plurality of lenses can be improved.

While the present invention has been shown and described in connection with the embodiments, it will be apparent to those skilled in the art that modifications and variations can be made without departing from the spirit and scope of the invention as defined by the appended claims.

What is claimed is:

1. A lens module, comprising:
a first lens having an extended portion;
a second lens in contact with inner circumferential surface of the extended portion to be aligned with the first lens; and
a third lens in contact with the inner circumferential surface of the extended portion to be aligned with the second lens,
wherein the extended portion has at least one first groove with first width and at least one second groove with second different width formed therein, the at least one first groove and the at least one second groove extending in a longitudinal direction of the extended portion, and
each of the second lens has at least one first protrusion to be inserted into the at least one of the at least one first groove or the at least one second groove and the third lens has at least one second protrusion to be inserted into the other of the at least one first groove or the at least one second groove.

2. The lens module of claim 1, wherein the inner circumferential surface of the extended portion is defined as a conical sectional surface of a theoretical cone inclinedly angled with respect to an optical axis.

3. The lens module of claim 2, wherein each of the second lens and the third lens has an inclined surface in contact with the conical sectional surface.

4. The lens module of claim 2, wherein the second lens and the third lens have different radii.

5. The lens module of claim 1, wherein the extended portion has the at least one first groove formed therein, the at least one first groove extending in a longitudinal direction of the extended portion.

6. The lens module of claim 1, wherein the second lens includes the at least one first protrusion to be inserted into the at least one first groove, and the third lens includes the at least one second protrusion to be inserted into the at least one second groove.

7. The lens module of claim 1, wherein the extended portion has a fixation groove formed therein, the fixation groove extending in a longitudinal direction of the extended portion and then extending in a circumferential direction of the extended portion.

8. The lens module of claim 7, wherein the third lens includes a protrusion protruded to be guided by the fixation groove.

9. The lens module of claim 1, further comprising a fourth lens group in contact with the extended portion to be aligned with the third lens.

10. The lens module of claim 9, wherein the fourth lens group includes a plurality of lenses.

11. A lens module, comprising:
a first lens;
a second lens coupled to the first lens and having an extended portion;
a third lens in contact with the inner circumferential surface of the extended portion to be aligned with the second lens; and
a fourth lens in contact with the inner circumferential surface of the extended portion to be aligned with the third lens,
wherein the extended portion has at least one first groove with first width and at least one second groove with second different width formed therein, the at least one first groove and the at least one second groove extending in a longitudinal direction of the extended portion,
the third lens includes at least one first protrusion to be inserted into the at least one first groove or the at least one second groove, and the fourth lens includes at least one second protrusion to be inserted into the other of the at least one first groove or the at least one the second groove.

12. The lens module of claim 11, wherein the inner circumferential surface of the extended portion is defined as a conical sectional surface of a theoretical cone inclinedly angled with respect to an optical axis.

13. The lens module of claim 12, wherein each of the third lens and the fourth lens has an inclined surface in contact with the conical sectional surface.

14. The lens module of claim 12, wherein the third lens and the fourth lens have different radii.

15. The lens module of claim 11, wherein the extended portion has the at least one first groove formed therein, the at least one first groove extending in a longitudinal direction of the extended portion.

16. The lens module of claim 15, wherein each of the third lens and the fourth lens has at least one of the first protrusion and one of the second protrusion to be inserted into the at least one groove.

17. The lens module of claim 11, wherein the extended portion has a fixation groove formed therein, the fixation groove extending in a longitudinal direction of the extended portion and then extending in a circumferential direction of the extended portion.

18. The lens module of claim 17, wherein the fourth lens includes a protrusion protruded to be guided by the fixation groove.

19. The lens module of claim 11, further comprising a fifth lens group in contact with the extended portion to be aligned with the fourth lens.

20. The lens module of claim 19, wherein the fifth lens group includes a plurality of lenses.

* * * * *